US008639556B2

(12) United States Patent
Morimura et al.

(10) Patent No.: US 8,639,556 B2
(45) Date of Patent: Jan. 28, 2014

(54) DETERMINING OPTIMAL ACTION IN CONSIDERATION OF RISK

(75) Inventors: Tetsuro Morimura, Kanagawa-ken (JP); Takayuki Osogami, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 13/235,642

(22) Filed: Sep. 19, 2011

(65) Prior Publication Data

US 2012/0072259 A1    Mar. 22, 2012

(30) Foreign Application Priority Data

Sep. 22, 2010    (JP) .................................. 2010-211588

(51) Int. Cl.
*G06Q 10/00* (2012.01)
(52) U.S. Cl.
USPC ........................................... 705/7.28; 706/52
(58) Field of Classification Search
USPC ........................................... 705/7.28; 706/52
See application file for complete search history.

(56) References Cited

FOREIGN PATENT DOCUMENTS

| JP | 2001-125953 | | 5/2001 |
|---|---|---|---|
| JP | 2002-041778 | | 2/2002 |
| JP | 2002-157425 | | 5/2002 |
| JP | 2002-183429 | | 6/2002 |
| JP | 2003-006431 | | 1/2003 |
| JP | 2003-345981 | A | 12/2003 |
| JP | 2005-107994 | A | 4/2005 |
| JP | 2006-500692 | A | 1/2006 |
| JP | 2008-040522 | | 2/2008 |

OTHER PUBLICATIONS

Boda, Kang. Filar, Jerzy A. Time Consistent Dynamic Risk Measures. Center for Industrial and Applied Mathematics. 2005.*
H. Markowitz, "Portfolio Selection," Journal of Finance, vol. 7, pp. 77-91, Mar. 1952.
G. Tirenni, et al., "Efficient allocation of marketing resources using dynamic programming," in Proceedings of the SIAM International Conference on Data Mining, pp. 581-585, 2005.
J. A. Filar, et al., "Variance-penalized markov decision processes," Mathematics of Operations Research, vol. 14, pp. 147-161, 1989.
D. J. White, "Mean, variance, and probabilistic criteria in finite Markov decision processes: A review," Journal of Optimization Theory and Applications, vol. 56, No. 1, pp. 1-29, 1988.

(Continued)

*Primary Examiner* — Johnna Loftis
(74) *Attorney, Agent, or Firm* — Cantor Colburn LLP

(57) ABSTRACT

A system and method for determining an optimal action in consideration of risk. The method includes the steps of: (a) selecting a state from possible states in a current term; (b) selecting an action from action candidates that can be executed in a selected state; (c) calculating a probability distribution of an evaluation value for a selected action; (d) calculating a risk measure using the probability distribution of the evaluation value; (e) determining a weighting function conforming to at least one preference by taking the risk measure into consideration; (f) calculating a value measure of the selected action; (g) repeating steps (b) through (f) for all other the action candidates that can be executed in the selected state; and (h) comparing the value measures of the selected actions in order to determine an optimal action for the selected state.

19 Claims, 17 Drawing Sheets

(56) References Cited

OTHER PUBLICATIONS

R. Munos and A. W. Moore, "Variable Resolution Discretization for High-Accuracy Solutions of Optimal Control Problems," in Proceedings of the International Joint Conference Artificial Intelligence, 1999, pp. 1348-1355.

R. Neuneier, "Enhancing Q-learning for Optimal Asset Allocation," in Advances in Neural Information Processing Systems, 1998, vol. 10, pp. 936-942.

H. Kawai, "A variance minimization problem for a Markov decision process," European Journal of Operational Research, vol. 31, pp. 140-145, 1987.

M. L. Puterman, Markov Decision Process, John Wiley and Sons, pp. vii-xiv, 1994.

M. R. Hardy and J. L. Wirch, "The iterated CTE: A dynamic risk measure," The North American Actuarial Journal, 62-75, 2004.

P. Boyle, M. Hardy, and T. Vorst, "Life after VaR." Journal of Derivatives, 13(1): pp. 48-55, 2005.

B. Acciaio and I. Penner, "Dynamic risk measures," Advanced Mathematical Methods for Finance, 2011, VII 536, pp. 1-34, Feb. 17, 2010.

M. Kupper and W. Schachemayer, "Representation results for law invariant time consistent functions," University of Vienna, Vienna, Austria, pp. 1-25, Aug. 24, 2009.

F. Riedel, "Dynamic coherent risk measures," Stochastic Processes and their Applications 112, pp. 185-200, 2004.

P. Artzner, et al., "Coherent multiperiod risk adjusted values and Bellman's principle," Annals of Operations Research, 12(1), pp. 1-20, 2007.

T. Wang, "A class of dynamic risk measures," University of British Columbia, Vancouver, BC, Canada, pp. 1-34 Sep. 1999.

\* cited by examiner

130

| Transition Target State<br>(State, Action) | $s_1$ | $a_2$ | ...... | $a_n$ |
|---|---|---|---|---|
| $(s_1, a_1)$ | 0.25 | 0.40 | | 0.30 |
| $(s_1, a_2)$ | 0.20 | 0.30 | | 0.20 |
| ⋮ | ⋮ | ⋮ | | ⋮ |
| $(s_1, a_n)$ | 0.10 | 0.15 | | 0.12 |
| ⋮ | ⋮ | ⋮ | ...... | ⋮ |
| $(s_m, a_1)$ | 0.30 | 0.35 | | 0.25 |
| $(s_m, a_2)$ | 0.15 | 0.05 | | 0.15 |
| ⋮ | ⋮ | ⋮ | | ⋮ |
| $(s_m, a_n)$ | 0.20 | 0.25 | | 0.15 |

| Transition Target State (State, Action) | $s_1$ | $a_2$ | ...... | $a_n$ |
|---|---|---|---|---|
| $(s_1, a_1)$ | $4.50 | $2.10 | | $2.30 |
| $(s_1, a_2)$ | $2.30 | $1.80 | | $5.00 |
| ⋮ | ⋮ | ⋮ | | ⋮ |
| $(s_1, a_n)$ | $3.50 | $4.00 | | $5.50 |
| ⋮ | ⋮ | ⋮ | ...... | ⋮ |
| $(s_m, a_1)$ | $3.00 | $3.20 | | $4.80 |
| $(s_m, a_2)$ | $2.50 | $2.20 | | $5.60 |
| ⋮ | ⋮ | ⋮ | | ⋮ |
| $(s_m, a_n)$ | $3.80 | $5.50 | | $7.50 |

Optimal Action $a^* = a_3$

Optimal Value : $v^*(s_1, T_{k+1})$

· · · · · ·

Optimal Action $a^* = a_2$

Optimal Value : $v^*(s_2, T_{k+1})$

· · · · · ·

· · · · · ·

Optimal Action $a^* = a_3$

Optimal Value : $v^*(s_3, T_{k+1})$

130

| (Target State Cumulative Reward) / (State, Cumulative Reward, Action) | $(s_1, c_1)$ | $(s_1, c_2)$ | ...... | $(s_n, c_q)$ |
|---|---|---|---|---|
| $(s_1, c_1, a_1)$ | 0.25 | 0.40 | | 0.30 |
| $(s_1, c_2, a_1)$ | 0.20 | 0.30 | | 0.20 |
| ⋮ | ⋮ | ⋮ | | ⋮ |
| $(s_1, c_q, a_1)$ | 0.10 | 0.15 | | 0.12 |
| $(s_1, c_1, a_2)$ | 0.08 | 0.13 | | 0.30 |
| ⋮ | ⋮ | ⋮ | | ⋮ |
| $(s_1, c_1, a_n)$ | 0.28 | 0.33 | | 0.20 |
| $(s_3, c_1, a_1)$ | 0.12 | 0.03 | | 0.18 |
| ⋮ | ⋮ | ⋮ | ...... | ⋮ |
| $(s_2, c_q, a_n)$ | 0.30 | 0.35 | | 0.25 |
| $(s_3, c_1, a_1)$ | 0.15 | 0.05 | | 0.15 |
| ⋮ | ⋮ | ⋮ | | ⋮ |
| $(s_m, c_1, a_1)$ | 0.20 | 0.25 | | 0.15 |
| ⋮ | ⋮ | ⋮ | | ⋮ |
| $(s_m, c_q, a_n)$ | 0.30 | 0.33 | | 0.20 |

FIG. 17

DETERMINING OPTIMAL ACTION IN CONSIDERATION OF RISK

CROSS-REFERENCE TO RELATED APPLICATION

This application claims priority under 35 U.S.C. §119 from Japanese Patent Application No. 2010-211588 filed Sep. 22, 2010, the entire contents of which are incorporated herein by reference.

BACKGROUND OF THE INVENTION

1. Field of the Invention

The present invention relates to a determination of an optimal action, and more particularly to a determination of an optimal action in consideration of risk by repetitively calculating a risk measure.

2. Description of Related Art

Studies on Markov Decision Process (MDP) have been underway (G. Tirenni, A. Labbi, A. Elisseeff, and C. Berrospi, "Efficient allocation of marketing resources using dynamic programming," in Proceedings of the SIAM International Conference on Data Mining, 2005, J. A. Filar, L. C. M. Kallenberg, and H. Lee, "Variance-penalized Markov decision processes," Mathematics of Operations Research, vol. 14, pp. 147-161, 1989, D. J. White, "Mean, variance, and probabilistic criteria in finite Markov decision processes: A review," Journal of Optimization Theory and Applications, vol. 56, no. 1, pp. 1-29, 1988, R. Munos and A. W. Moore, "Variable resolution discretization for high-accuracy solutions of optimal control problems," in Proceedings of the International Joint Conference on Artificial Intelligence, 1999, pp. 1348-1355, R. Neuneier, "Enhancing Q-learning for optimal asset allocation," in Advances in Neural Information Processing Systems, 1998, vol. 10, pp. 936-942, H. Kawai, "A variance minimization problem for a Markov decision process," European Journal of Operational Research, vol. 31, pp. 140-145, 1987, M. L. Puterman, Markov Decision Processes, John Wiley and Sons, 1994). A Markov Decision Process maximizes cumulative reward that will be gained from an object. The object can transition between states by performing actions at time steps within a time horizon of interest, where the time horizon of interest is characterized by certain rules. Markov Decision Process possesses Markov property, which is a future state transition that determined by depending on the current state but not on the past state transitions. By using Markov Decision Process, an optimal action for each time step of a time horizon can be determined.

Researches on portfolio theory have been conducted (H. Markowitz, "Portfolio Selection," Journal of Finance, vol. 7, pp. 77-91, March 1952). In addition, approaches to risk management, such as application to management of asset portfolios, are also being studied by financial companies (Japanese Patent Laid-Open No. 2008-0040522, Japanese Patent Laid-Open No. 2001-0125953, Japanese Patent Laid-Open No. 2002-0041778, Japanese Patent Laid-Open No. 2002-0157425, Japanese Patent Laid-Open No. 2002-0183429, Japanese Patent Laid-Open No. 2003-0006431, Japanese Patent Laid-Open No. 2003-0345981, Japanese Patent Laid-Open No. 2005-0107994). There are also researches on dynamic risk measures for risk management (Japanese Patent Laid-Open No. 2006-0500692, M. R. Hardy and J. L. Wirch, "The iterated CTE: A dynamic risk measure," The North American Actuarial Journal, 62-75, 2004, P. Boyle, M. Hardy, and T. Vorst, "Life after VaR," Journal of Derivatives, 13(1): 48-55, 2005, B. Acciaio and I. Penner, "Dynamic risk measures," Feb. 17, 2010, M. Kupper and W. Schachercaner, "Representation results for law invariant time consistent functions," Aug. 24, 2009, F. Riedel, "Dynamic coherent risk measures," Stochastic Processes and their Applications, 112: 185-200, 2004, P. Artzner, F. Delbaen, J.-M. Eber, D. Heath, and H. Ku, "Coherent multiperiod risk adjusted values and Bellman's principle," Annals of Operations Research, 152 (1):5-22, 2007, T. Wang, "A class of dynamic risk measures," September, 1999).

SUMMARY OF THE INVENTION

Accordingly, one aspect of the present invention provides a method for determining optimal action in consideration of risk, the method including the steps of: (a) selecting a state from possible states in a current term, where the current term belongs to a time horizon; (b) selecting an action from action candidates that can be executed in a selected state; (c) calculating a probability distribution of an evaluation value for a selected action, where the evaluation value corresponds to a reward obtained in the current term and an optimal value for next term; (d) calculating a risk measure using the probability distribution of the evaluation value; (e) determining a weighting function conforming to at least one preference by taking the risk measure into consideration; (f) calculating a value measure of the selected action; (g) repeating steps (b) through (f) for all other the action candidates that can be executed in the selected state; and (h) comparing the value measures of the selected actions in order to determine an optimal action for the selected state, where at least one of the steps is carried out using a computer device.

Another aspect of the present invention provides a computer readable storage medium tangibly embodying a computer readable program code having computer readable instructions which when implemented, cause a computer to carry out the steps including: (a) selecting a state from possible states in a current term, where the current term belongs to a time horizon; (b) selecting an action from action candidates that can be executed in a selected state; (c) calculating a probability distribution of an evaluation value for a selected action, where the evaluation value corresponds to a reward obtained in the current term and an optimal value for next term; (d) calculating a risk measure using the probability distribution of the evaluation value; (e) determining a weighting function conforming to at least one preference by taking the risk measure into consideration; (f) calculating a value measure of the selected action; (g) repeating steps (b) through (f) for all other the action candidates that can be executed in the selected state; and (h) comparing the value measures of the selected actions in order to determine an optimal action for the selected state Another aspect of the present invention provides a system that determines optimal action in consideration of risk, the system including: a first selection module for selecting a state from possible states in a current term, where the current term belongs to a time horizon; a second selection module for selecting an action from action candidates that can be executed in a selected state; a probability distribution module for calculating a probability distribution of an evaluation value for a selected action, where the evaluation value corresponds to a reward obtained in the current term and an optimal value for next term; a risk measure module for calculating a risk measure using the probability distribution of the evaluation value; a decision module for determining a weighting function conforming to at least one preference by taking the risk measure into consideration; a value measure module for calculating a value measure of the selected action; a control module for repeating the steps from the first selection module, the second selection module, the probability distribution module, the risk measure module, the decision module, and the value measure module for all other the action candidates that can be executed in the selected state; and a comparing module for comparing the value measures of the selected actions in order to determine an optimal action for the selected state.

BRIEF DESCRIPTION OF THE DRAWINGS

FIG. 2 shows an exemplary data structure of a transition probability storing unit according to an embodiment of the invention.

FIG. 3 shows an exemplary data structure of a reward parameter storing unit according to an embodiment of the invention.

FIG. 17 shows another example of data structure used in the transition probability storing unit according to an embodiment of the invention.

DETAILED DESCRIPTION OF THE PREFERRED EMBODIMENTS

Figure 1:
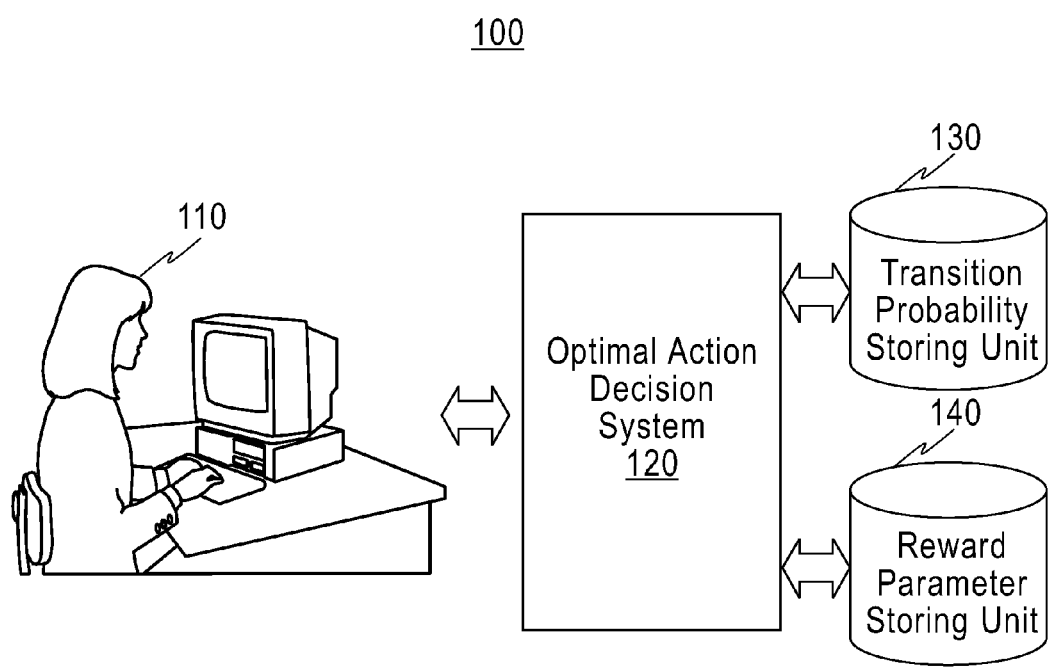
FIG. 1 shows an overall configuration of an information system according to an embodiment of the invention.

According to Markov Decision Process, actions are typically optimized by using an expectation or exponential utility, because such optimization ensures time-consistency and allows an optimal action to be efficiently derived by dynamic programming.

However, optimization of actions based on an expectation or exponential utility have limitations, because the resulting optimal action is independent of the amount of reward already gained and is unable to represent preferences that take risk measure, e.g. "Value at Risk" (VaR), into consideration.

It is difficult to optimize a Markov Decision Process by utilizing known risk measures such as Value at Risk and Conditional Tail Expectation (CTE), because an optimal action determined with known risk measures cannot ensure time-consistency. As a result, an optimal action is determined with respect to a value measure only at a certain time step, when the action may not be optimal in the future.

The invention will be described with respect to modes for carrying out the invention (hereinafter, referred to as embodiments of the invention). The embodiments described below are not intended to limit the claimed invention and not all combinations of features mentioned in the embodiments are essential for solution of the invention.

Information system 100 according to embodiments of the invention is provided in advance with data on state transition probability, parameters associated with reward for an action that is executed in a certain state, and/or etc. In accordance with a request from a user, optimal actions are determined for respective terms ($T_1, T_2, \ldots T_n$) of a time horizon, where the time horizon starts from a later term and proceeds toward an earlier term. Optimal actions determined are finally presented to the requesting user as information for making a decision.

Embodiments of the invention calculate a value measure that considers risk in conformance with predetermined preferences for each action candidate that can be executed in each state that is possible within a term, and determine an action candidate having the best value measure to be the optimal action. An optimal action determined for a state is associated with the state and stored along with a value measure (hereinafter called "optimal value" and sometimes denoted as "$v^*(s, t)$") corresponding to the optimal action. The stored optimal value is used for determining optimal actions for the immediately preceding term.

According to embodiments of the invention, assuming first that the last term ($T_n$) is the current term (t) of the time horizon, states that are possible in the current term ($t=T_n$) are generated. Since an action is never executed in the last term ($T_n$), an optimal action is not determined for the last term ($T_n$). For a similar reason, a predefined initial value is substituted to the optimal value for each state of the last term ($T_n$).

Then, assuming the second last term ($T_{n-1}$) is the current term (t), states that are possible in the current term ($t=T_{n-1}$) are generated and value measures (VMs) are calculated for all action candidates that can be executed in each of the states. Although the value measure can be any measure that can serve to evaluate an action, embodiments of the invention use a value measure calculated in a manner described below. The value measures calculated for the action candidates are then compared to each other and an action candidate having the best value measure is determined to be the optimal action for the state. The value measure determined for the optimal action is also established as the optimal value for the state. The optimal action and optimal value determined for a state are stored being associated with the state.

A value measure for an action candidate is calculated through data processing in the following manner. First, probability distribution of an evaluation value X that depends on reward that is obtained when the action candidate is executed and an optimal value stored being associated with a transition target state is determined, and a risk measure $V_\alpha$ for the probability distribution of the evaluation value X is calculated. Then, a weighting function w(x) is determined using the risk measure $V_\alpha$ according to predetermined preferences so that risk is taken into consideration in decision of an optimal action. Then, a weighted sum $\Sigma w(x)*x$ using the weighting function w(x) is calculated to derive the value measure VM for the action candidate.

Determination and storage of an optimal action and an optimal value as described above are repeated for other possible states in the current term. When determination and storage of an optimal action and optimal value have been completed for all possible states in the current term, the immediately preceding term is set as the current term and determination and storage of an optimal action and optimal value are carried out for all possible states of the current term. This process is repeated up to the first term ($t=T_1$) to determine optimal actions for all possible states in each term of the time horizon, which are then provided to the user as information for making a decision.

First Embodiment

FIG. 1 illustrates an overall configuration of information system 100 according to an embodiment of the invention. Information system 100 includes user computer 110, optimal action decision system 120, transition probability storing unit 130, and reward parameter storing unit 140. User computer 110 according to the embodiment of the invention sends a request to optimal action decision system 120 and receives information on optimal actions returned.

A request from user computer 110 contains information on first and last terms of a time horizon for which actions will be determined, interval of terms, states that are possible in the last term, and other restriction information. As a specific example, a request can contain information that the first term of the time horizon is September of 2010, the last term is August of 2011, the interval of terms is three months (i.e., quarterly), states that are possible in the last term are $s_1$, $s_2$, and $s_3$, and so on. Information on optimal actions returned by optimal action decision system 120 to the user computer includes information about the optimal action for each state possible in individual terms of the time horizon ($T_1$, $T_2$, ..., $T_n$).

Transition probability storing unit 130 stores, for each one of possible states, the transition probability of transitioning to each state if an action is executed in that state. A state refers to combination of various attributes, such as the total amount of an asset possessed by an entity and composition of a portfolio, for example. In other words, a case where the entity is classified into one segment depending on the combination of such attributes can be defined as state $s_1$, a case where the entity is classified into another segment can be defined as state $s_2$, and so on. An action includes an act to cause a change in the contents of an asset portfolio possessed by an entity (typically including, but not limited to, buying and selling of part of an asset), for example. In summary, state transition as referred to in the embodiments of the invention means a situation in which an entity that has belonged to one segment comes to belong to another segment as a result of executing an action, for example, and the probability that such a change occurs is called transition probability.

Reward parameter storing unit 140 according to embodiments of the invention stores parameters indicative of probability distribution of reward that is obtained when transition to a state occurs as a result of executing an action in each of possible states. Reward can be defined as profit or loss that is produced if one sells part of or adds to an asset portfolio he possesses, for example. Parameters indicating reward probability distribution can be a mean and a variance for probability distribution compliant with normal distribution, for example.

Data stored in transition probability storing unit 130 and reward parameter storing unit 140 can be generated in advance by analyzing information on past research history or the like and updated. Such data can be generated and updated by the user operating computer 110 to access transition probability storing unit 130 and reward parameter storing unit 140 through optimal action decision system 120 and editing data, or by an administrator directly accessing transition probability storing unit 130 and reward parameter storing unit 140 to edit data. Alternatively, information acquired by a computer through automatic and periodical access to an external information source can be analyzed to automatically generate and update such data. As details of generation and update of data can be implemented by so-called skilled artisans as appropriate, they are not described here in further detail.

Optimal action decision system 120 according to embodiments of the invention determines an optimal action that takes risk into consideration for each of states that are possible in each term of the time horizon ($T_1$, $T_2$, ..., $T_n$) according to specific preferences. Information on optimal actions determined is presented to the user via user computer 110.

Thus, information system 100 according to the first embodiment aims to output for presentation to the user optimal actions that consider risk in accordance with specific preferences in response to a request from the user, when provided beforehand with data on state transition probability and/or rewards for actions executed in a state.

FIG. 2 shows an example of data structure for transition probability storing unit 130 according to embodiments of the invention. Transition probability storing unit 130 has stored therein the transition probability that transition to a certain state occurs if an action is executed in each possible state. Herein, a state is expressed by variable s, specifically, states are denoted as $s_1$, $s_2$, ..., $s_m$. A set of possible states is represented by S. Accordingly, s∈S. An executable action is represented by variable a, specifically, actions are denoted as $a_1$, $a_2$, ..., $a_n$. A set of executable actions is represented as A. Accordingly, a∈A.

Specifically, transition probability storing unit 130 according to embodiments of the invention stores a transition probability for each combination of a pair of a transition source state and an action (s, a), and a target state, s. For example, the probability that no state transition occurs and state remains $S_1$ as a result of executing action $a_1$ in state $S_1$ is 25%, and the probability that transition to state $s_2$ occurs is 40%. Note that the total transition probability in each row of the table shown in FIG. 2 (e.g., 0.25+0.40+ ... +0.30 in the row ($s_1$, $a_1$)) is 1.

FIG. 3 shows an example of data structure for reward parameter storing unit 140 according to embodiments of the invention. Reward parameter storing unit 140 stores a parameter indicating the probability distribution of reward that is obtained when transition to a certain state occurs as a result of executing an action in each of possible states.

More specifically, reward parameter storing unit 140 according to embodiments of the invention stores, for each combination of a pair of a source state and an action (s, a) and a target state s, a mean value of reward that is obtained as a result of transition from the source to the target state. For example, a mean reward that is obtained when transition to state $s_2$ occurs as a result of executing action $a_1$ in state $s_1$ is $4.5 and the mean reward obtained when transition to state $s_2$ occurs is $2.1.

Since probability distribution cannot be determined only with a mean for some kinds of reward distribution, reward parameter storing unit 140 stores similar tables to the one shown in FIG. 3 respectively for variance and other required parameters (not shown). Other required parameters can include skewness and location parameters for stable distribution, for example. As a data structure for storing these parameters is similar to the above-described one except that the mean value is replaced with other such parameters, it is not described in greater detail.

Figure 4:
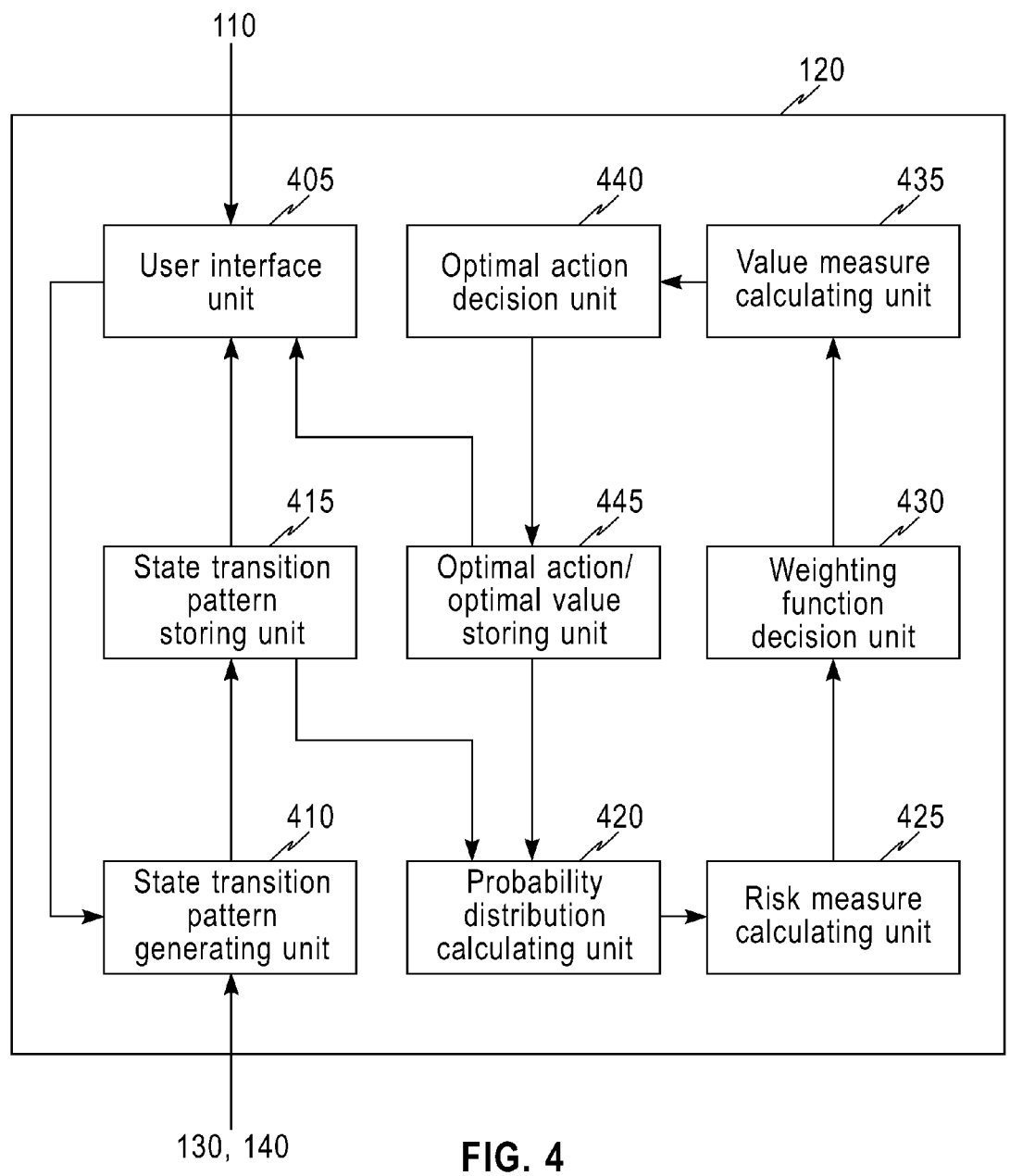
FIG. 4 illustrates a functional configuration of an optimal action decision system according to an embodiment of the invention.

FIG. 4 shows a functional configuration of optimal action decision system 120 according to embodiments of the invention. The elements shown in the functional configuration of FIG. 4 can be realized by loading computer programs stored in a hard disk device 13, such as an operating system and an authoring software, into main memory 4 to be read into a CPU 1 so as to make hardware resources and software cooperate in an information processing device having the hardware configuration illustrated in FIG. 16 described later.

Optimal action decision system 120 includes user interface unit 405, state transition pattern generating unit 410, state transition pattern storing unit 415, probability distribution calculating unit 420, risk measure calculating unit 425, weighting function decision unit 430, value measure calculating unit 435, an optimal action decision unit 440, and optimal action/value measure storing unit 445.

User interface unit 405 according to embodiments of the invention functions as an interface for exchanging information data with user computer 110. Specifically, user interface unit 405 has state transition pattern generating unit 410 generate state transition patterns upon receiving a request for information about optimal actions from user computer 110, and triggers a sequence of processing for determining optimal actions for the state transition patterns. User interface unit 405 also has a function to send information about optimal actions determined back to user computer 110.

State transition pattern generating unit 410 according to embodiments of the invention makes reference to data stored in transition probability storing unit 130 and reward parameter storing unit 140 in accordance with an instruction received from user interface unit 405 and generates state transition patterns. In embodiments of the invention, a state transition pattern generated by state transition pattern generating unit 410 is graph data including:

1) Node data representing some or all of states that are possible in the time horizon ($T_1, T_2, \ldots, T_n$);

2) Directed edge data representing transitions from source states to target states; and 3) Attribute data representing actions that can be executed in each state, the transitional probability of transitioning to each target state if each action is executed, and the probability distribution of reward that is obtained when each action is executed.

State transition pattern generating unit 410 according to embodiments of the invention generates such state transition patterns in the following procedure. First, the user sets the last term ($T_n$) as the current term and generates states that are specified as possible states for the current term. Then, assuming that the second last term ($T_{n-1}$) is the current term, possible states for the current term are generated, and each of the states is combined with action candidates that can be executed in that state and the transition probability of transitioning to each target state if each action candidate is executed. Then, on the condition that the optimal action and optimal value have been determined for all possible states in the current term $T_{n-1}$, the third last term ($T_{n-2}$) is assumed to be the current term, states possible in the current term are generated, and each of the states is combined with action candidates that can be executed in that state and transition probability of transitioning to each target state if each action candidate is executed. Embodiments of the invention repeat this process up to the first term ($T_1$). Generation of state transition patterns will be described in greater detail later.

State transition pattern storing unit 415 according to embodiments of the invention sequentially stores state transition patterns generated by state transition pattern generating unit 410. Stored state transition patterns are retrieved and used such as by probability distribution calculating unit 420.

Probability distribution calculating unit 420 according to embodiments of the invention calculates probability distribution of the evaluation value X that is dependent on reward which is obtained if an action candidate is executed and a value measure (the optimal value) corresponding to the optimal action for the next term, for each action candidate that can be executed in a possible state at a certain time step. Details about the probability distribution of the evaluation value X calculated by probability distribution calculating unit 420 will be discussed later.

Risk measure calculating unit 425 according to embodiments of the invention calculates a predetermined risk measure based on the probability distribution of evaluation value X calculated by probability distribution calculating unit 420. In embodiments of the invention, a predetermined risk measure $V_\alpha$ is determined using Value at Risk (also denoted as VaR), for example. Calculation of risk measure $V_\alpha$ and Value at Risk will be discussed later in greater detail.

Weighting function decision unit 430 according to embodiments of the invention determines a weighting function $w(x)$ for use in calculation of a value measure by value measure calculating unit 435, which will be described later, based on the user's preferences regarding risk and the predetermined risk measure $V_\alpha$ calculated by risk measure calculating unit 425.

Value measure calculating unit 435 according to embodiments of the invention calculates value measure VM for each of action candidates that can be executed in a state possible at a certain time step, by determining a weighted sum of weighting function $w(x)$ determined by weighting function decision unit 430.

Optimal action decision unit 440 according to embodiments of the invention compares value measures for action candidates that can be executed in a state possible at a certain time step calculated by value measure calculating unit 435, and determines an optimal action for that state. Upon having determined optimal actions for all possible states for the current state, optimal action decision unit 440 assumes the term immediately before the current term is now the current term and sends an instruction to state transition pattern generating unit 410 to generate state transition patterns that are possible in the new current term.

Optimal action/value measure storing unit 445 according to embodiments of the invention stores the optimal action for each state determined by optimal action decision unit 440 and a value measure relating to that optimal action (i.e., the optimal value) in association with that state.

Figure 5:
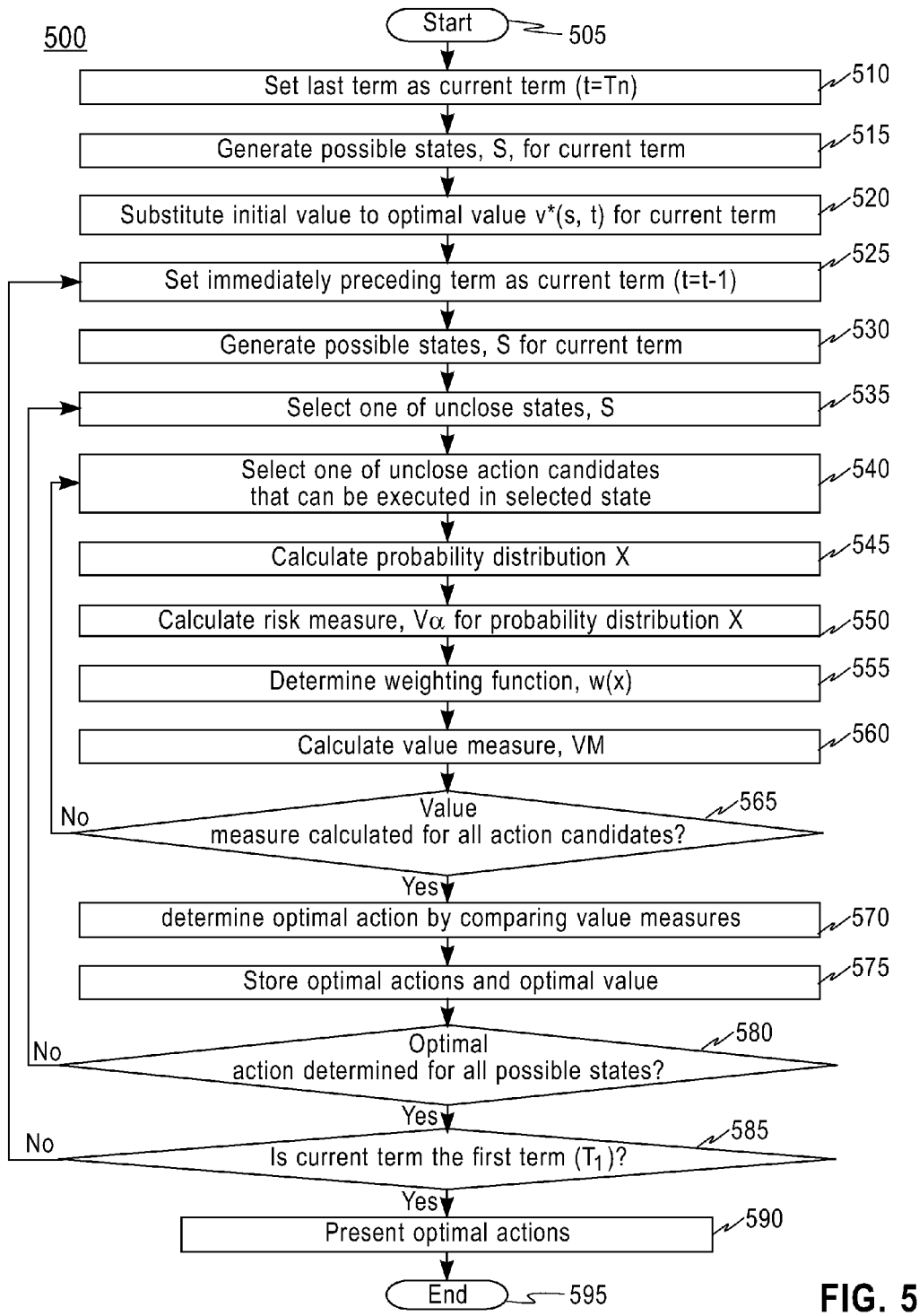
FIG. 5 is a flowchart illustrating a process of the optimal action decision system according to an embodiment of the invention.
Figure 6:
FIG. 6 is a diagram for illustrating flow of data processing for determining optimal actions according to an embodiment of the invention.
Figure 6:
Figure 6:
Figure 6:
Figure 6:
Figure 6:
Figure 7:
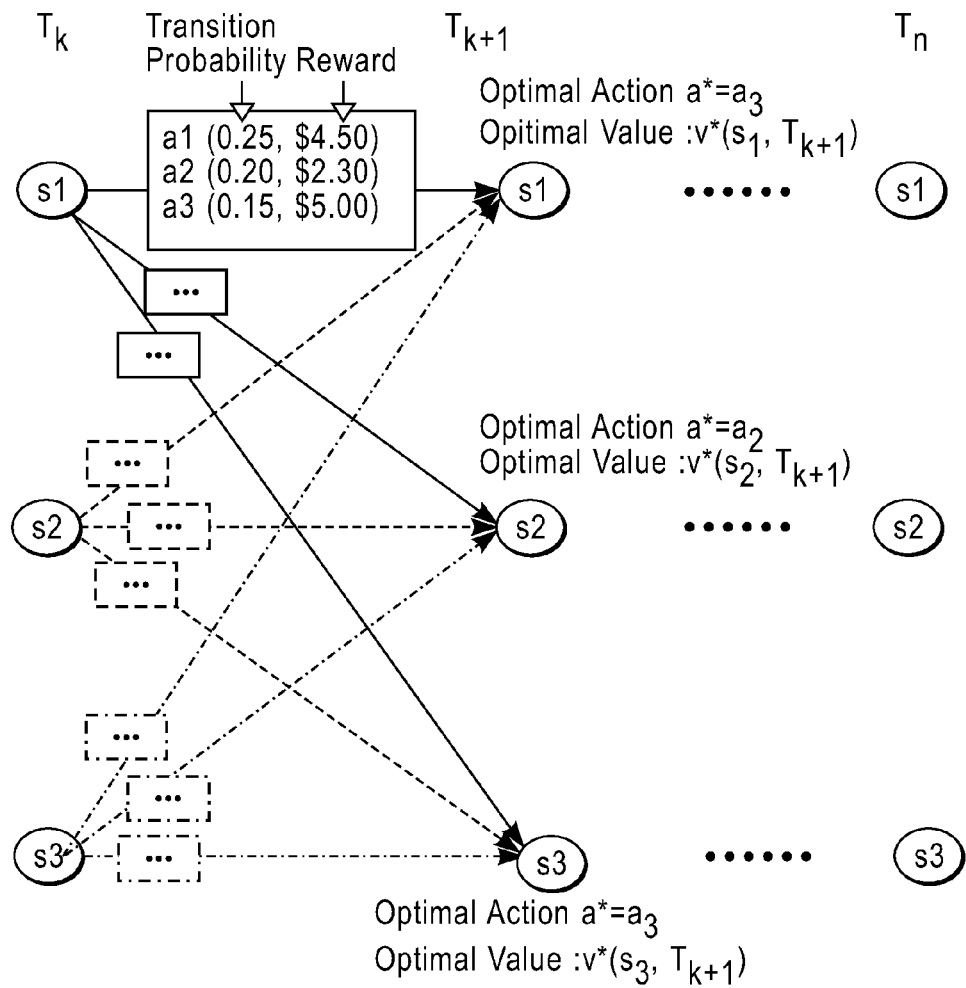
FIG. 7 is a diagram for illustrating flow of data processing for determining optimal actions according to an embodiment of the invention.
Figure 8:
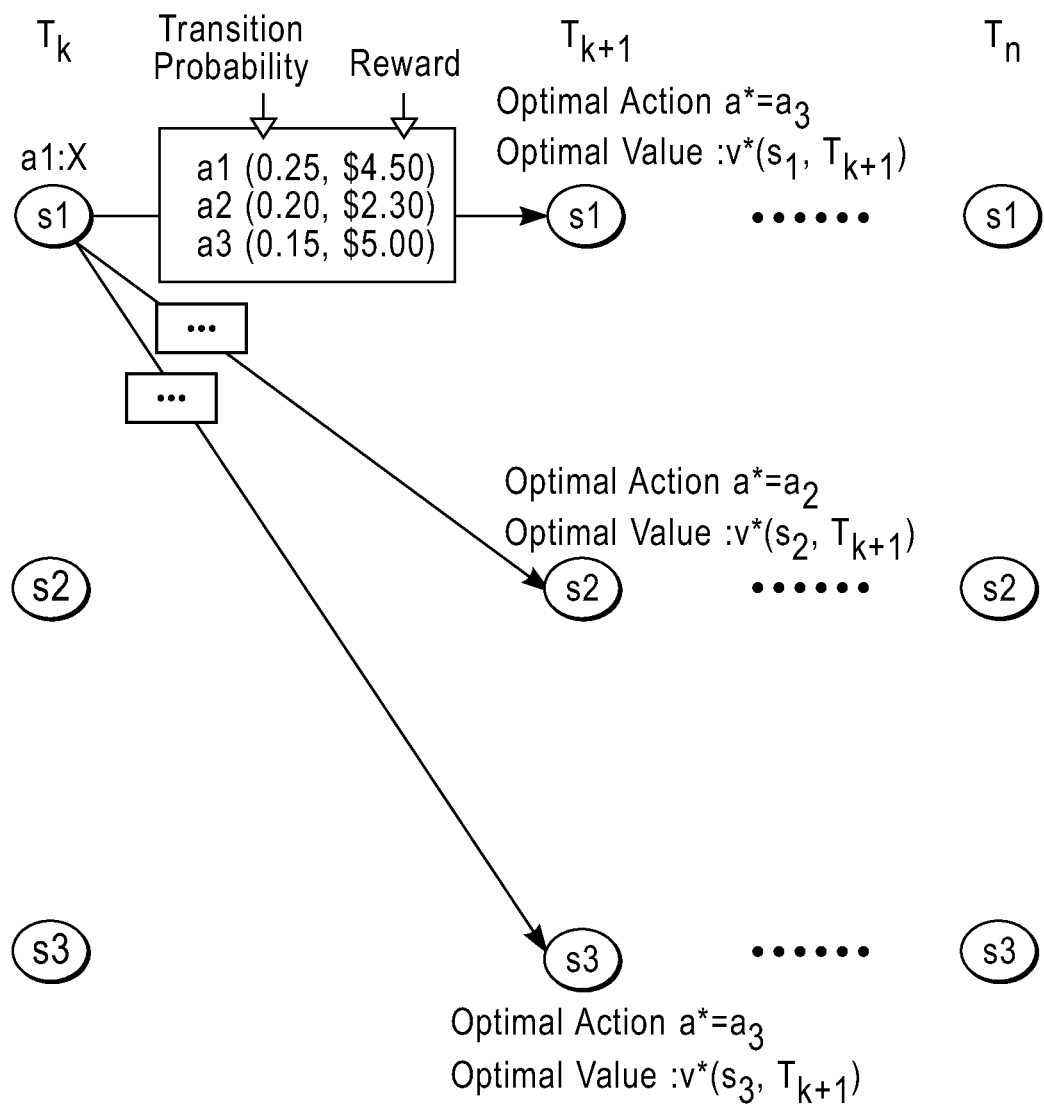
FIG. 8 is a diagram for illustrating flow of data processing for determining optimal actions according to an embodiment of the invention.
Figure 9:
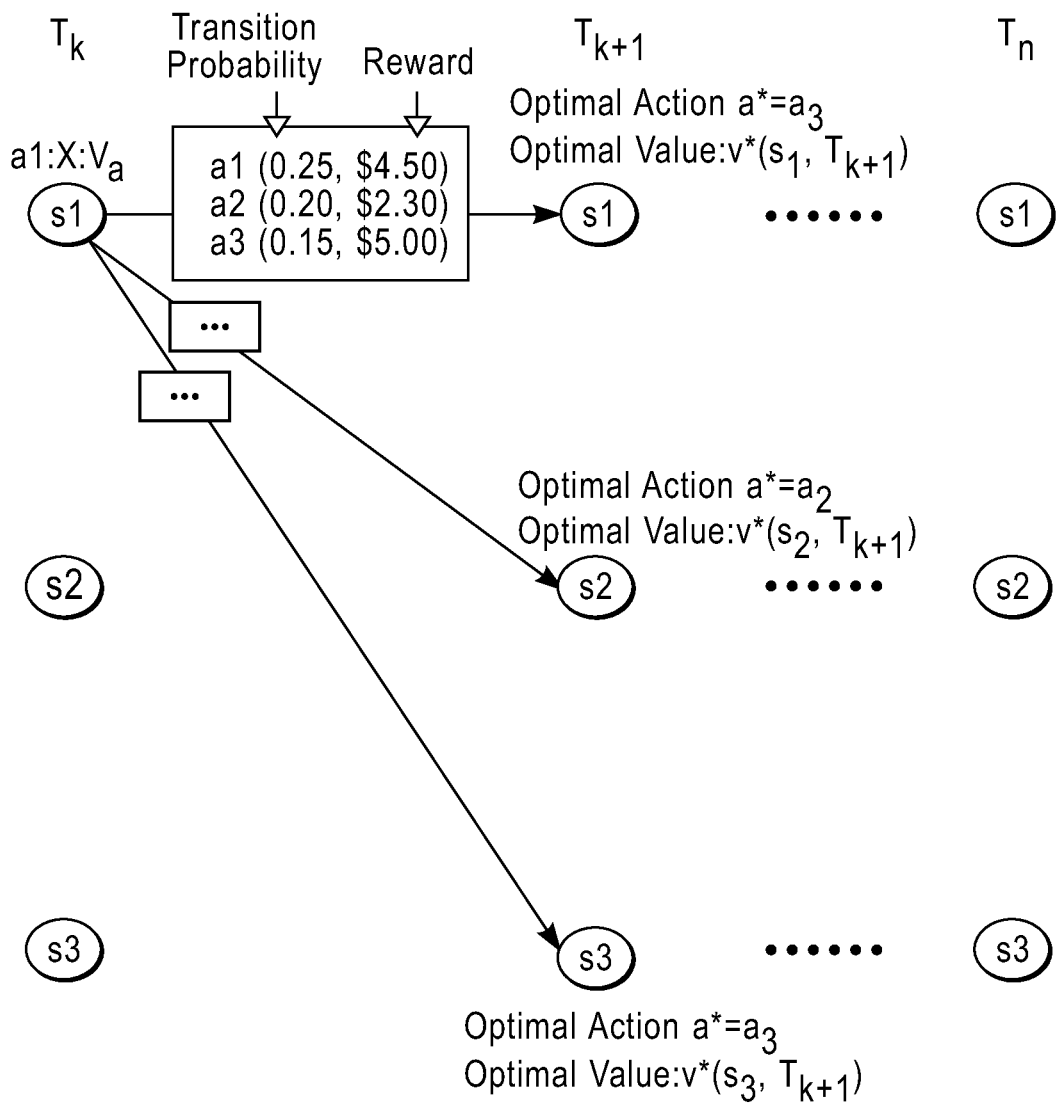
FIG. 9 is a diagram for illustrating flow of data processing for determining optimal actions according to an embodiment of the invention.

FIG. 5 is a flowchart 500 showing an overall operation of the data processing system according to an embodiment of the invention. The process starts at step 505, and, at step 510, the last term ($T_n$) of the time horizon is set as the current term (t) ($t=T_n$) in response to user interface unit 405 receiving a user request. Then, at step 515, graph data including nodes representing states $S=s_1, s_2, \ldots, s_m$ that are possible in the current term ($t=T_n$) is generated.

The process continues to step 520, where an initial value is substituted into the optimal value $v^*(s, T_n)$ for each of the states $S=s_1, s_2, \ldots, s_m$. The initial value substituted can be zero, for example. The initial value for substitution can be configured by the user or administrator in each case.

Then, at step 525, the second last term ($T_{n-1}$) is assumed to be the current term (t) ($t=T_{n-1}$). Then, at step 530, states $S=s_1, s_2, \ldots, s_m$ that are possible in the current term ($t=T_{n-1}$) are generated. In this case, graph data including nodes representing possible states $S=s_1, s_2, \ldots, s_m$ for the current term ($t=T_{n-1}$), directed edges representing transitions from states in the current term ($t=T_{n-1}$) to states in the next term ($t=T_n$), actions $A=a_1, a_2, \ldots, a_n$ that can be executed in each of the possible states $S=S_1, s_2, \ldots, s_m$ in the current term ($t=T_{n-1}$), the probability of transitioning to each target state when each of the actions is executed, and attribute data representing the probability distribution of reward that is obtained by executing each of the actions is added to the already generated graph data that includes nodes representing the possible states $S=s_1, s_2, \ldots, s_m$ in the next term ($t=T_n$).

At step 535, an element s that has not been selected yet is selected from the possible states $S=s_1, s_2, \ldots, s_m$ for the current term ($t=T_{n-1}$). Then, at step 540, an action 'a' which is one of action candidates yet to be selected that can be executed in the state, s, selected at step 535.

Then, at step 545, probability distribution of the evaluation value X is determined according to the expression shown below for the action 'a' selected at step 540. In the expression, r represents reward, and $v^*(s', t+1)$ is the optimal value relating to state s' of the next term (the term immediately following t, here $T_n$). $p_t(s', r|s, a)$ is defined as the probability that transition to state s' occurs and reward r is obtained if action 'a' is executed in state s in the current term ($t=T_{n-1}$). A sum represented by $\Sigma$ is determined by adding up $p_t(s', r|s, a)$ for all pairs of s' and r that make $r+v^*(s',t+1)=x$. In short, X represents such a discrete distribution that value x is assumed with a certain probability and, in this embodiment, corresponds to the sum of reward obtained in the current term and the optimal value for the next term.

$$X = x \text{ with probability} \sum_{(s',r):r+v^*(s',t+1)=x} p_t(s', r|s, a) \quad \text{[Expression 1]}$$

The process then proceeds to step 550, where predetermined risk measure $V_\alpha$ is calculated for the probability distribution of X determined at step 545. Embodiments of the invention determine risk measure $V_\alpha$ using Value at Risk. In embodiments of the invention, risk measure $V_\alpha$ is defined as the maximum amount of loss that is produced with a predetermined probability $\alpha$ (e.g., $\alpha=1\%$), and risk measure $V_\alpha$ for the case can be determined according to Expression 2 below using probability distribution of X (for example, the amount of loss that is produced with the percentage of $\alpha=1\%$ with respect to probability distribution of X can be defined as $V_\alpha$).

$$V_\alpha = VaR_\alpha(-X) \quad \text{[Expression 2]}$$

At step 555, a weighting function w(x) that depends on the risk measure $V_\alpha$ determined at step 550 is performed. Various types of function can be employed as the weighting function w(x) according to preferences about risk. For example, for a preference to balance maximization of cumulative reward that will be finally obtained and minimization of risk, the weighting function w(x) shown below can be established, where Pr(X=x) represents the probability that random variable X assumes the value of instance, x. In this case, the extent of risk taking can be adjusted by varying the value of b in the expression.

$$w(x)=b\ Pr(X=x) \text{ (if } x \neq -V_a\text{)}$$

$$w(x)=b\ Pr(X=-V_a)+1-b \text{ (if } x=-V_a\text{)} \quad \text{[Expression 3]}$$

Another possible preference is to perform optimization using a dynamic risk measure having time-consistency called ICTE (Iterated CTE), proposed by Hardy et al. in 2004 (see M. R. Hardy and J. L. Wirch, "The iterated CTE: A dynamic risk measure," The North American Actuarial Journal, 62-75, 2004.). ICTE was devised for use in a bank to determine an amount of capital reserve adequate for given risk at the time of making an investment or the like.

The ICTE is calculated by repetitively applying CTE (Conditional Tail Expectation). CTE is also known as Conditional Value at Risk or Expected Short Fall, calculated using Value at Risk. To be specific, CTE is determined as an expectation of loss Y that is produced when Y exceeds $V_\alpha$, according to the expression below using Value at Risk $V_\alpha$ which indicates that loss does not exceed $V_\alpha$ with the probability of $\alpha(0<\alpha<1)$ (however, the expression below assumes that probability distribution of Y is continuous):

$$CTE_\alpha(Y)=E[Y|Y>V_\alpha] \quad \text{[Expression 4]}$$

ICTE is calculated as follows. CTE for future loss Y as viewed from certain time step $T_{k-1}$ is calculated. CTE at time step $T_{k-1}$ can be deemed as a random variable when viewed from time step $T_{k-2}$, and CTE at $T_{k-1}$ varies depending on what occurs between $T_{k-2}$ and $T_{k-1}$. Thus, regarding CTE at time step $T_{k-1}$ as "loss", CTE for the loss can be calculated at time step $T_{k-2}$. Likewise, CTE at time step $T_{k-2}$ is a random variable when seen from $T_{k-3}$ and CTE for CTE at $T_{k-2}$ can be calculated at time step $T_{k-3}$. A risk measure determined by repetitively calculating CTE for CTE through iteration of this process represents ICTE (for details, see M. R. Hardy and J. L. Wirch, "The iterated CTE: A dynamic risk measure," The North American Actuarial Journal, 62-75, 2004.).

When a preference to use such ICTE for optimization, e.g., a preference to minimize ICTE[Y] which is ICTE for loss Y, is adopted, the following weighting function w(y) can be established, where $V_\alpha$ represents Value at Risk for Y. Extent of risk taking can be adjusted again by varying the value of $\alpha$. Note that although loss Y is used here instead of evaluation value X for facilitating understanding of ICTE, Y is generally the negative of X.

$$w(y)=Pr=(Y=y)/(1-\alpha) \text{ (if } y>V_a\text{)}$$

$$w(V_a)=(\beta-\alpha)/(1-\alpha) \text{ (if } y<V_a\text{)}$$

$$w(y)=0 \quad \text{[Expression 5]}$$

where $\beta=Pr(Y \leq V_a)$

At step 560, a value measure (VM(s, a, t)) is determined by determining the weighted sum of weighting function w(x) calculated at step 555 according to the expression below. Note that the expression needs to be modified as appropriate when loss Y is used instead of evaluation value X and a weighting function is established as w(y) for a preference to perform optimization using ICTE as described above. As those skilled in the art can make such modification as desired, it is not described in greater detail herein.

$$VM(s,a,t)=\Sigma_x(w(x)^*x) \quad \text{[Expression 6]}$$

At step 565, it is determined whether value measure VM has been calculated for all action candidates that can be executed in state, s. If not, the process returns to step 540 from the NO arrow, where an action that has not been chosen and for which value measure VM has not been calculated yet is selected and the loop from step 545 to 560 is executed on the action to calculate its value measure VM.

By repeating the process described above, value measure VM is calculated for all action candidates that can be executed in state s. When value measure VM has been calculated for all action candidates that can be executed in state s, the process proceeds from step 565 to step 570 through YES arrow.

At step 570, value measures VM calculated for possible action candidates for state s calculated in the loop from step 540 to 560 are compared with each other, and an action having the best value measure is determined to be the optimal action for state s. Then, at step 575, the optimal action determined at step 570 and the value measure associated with the optimal action are stored as the optimal value v*(s, t).

At step 580, it is determined whether optimal actions have been determined for all possible states in the current term. If not, the process returns to step 535 through NO arrow, where one of the other possible states is selected and the loop from step 540 to 575 is repeated for the state to determine its optimal action, and the optimal value is stored. By repeating this, optimal actions for all possible states in the current term ($t=T_{n-1}$) are obtained.

If it is determined at step 580 that optimal actions have been determined for all possible states in the current term, the flow proceeds to step 585 through YES arrow. At step 585, it is determined whether the current term is the first term ($t=T_1$). If not, the process returns to step 530 through the NO arrow, where the immediately preceding term ($T_{n-2}$) is set as the current term (t) ($t=T_{n-2}$) and the loop from step 535 through 580 is repeated for the new current term ($T_{n-2}$). By repeating this, optimal actions are determined for respective possible states from the first term ($T_1$) to the last term ($T_n$).

If it is determined at step 585 that the current term (t) is the first term ($t=T_1$), the flow proceeds to step 590 through YES arrow. At step 590, optimal actions for all possible states from the first term ($t=T_1$) through the last term ($t=T_n$) are presented to the user as information for making a decision. The process then proceeds to step 595 through NO arrow and terminates.

Now, for more detailed description of data processing performed for determining an optimal action, a process to determine an optimal action at a certain time step (defined as $t=T_k$) in a time horizon for which optimal actions are to be determined will be shown using FIGS. 6 through 15. As a premise for the process to determine an optimal action at $t=T_k$, it is assumed that optimal action a*(s, t) and optimal value v*(s, t) have been determined and stored as graph data at the time $t=T_{k+1}$ for possible states at $t=T_{n-1} \ldots T_{k+1}$ (see FIG. 6).

For the sake of simplicity, FIGS. 6 to 15 assume that states possible in each term are limited to three states, $s_1, s_2, s_3$, and actions that can be executed in each state are limited to three kinds of actions, $a_1, a_2, a_3$. For $T_n$, no optimal action exists because it is the last term of the time horizon and value v*(s, $T_n$) is preset to an initial value. Furthermore, note that in FIGS. 8 to 14, directed edges connected with states $s_2$ and $s_3$ at $T_k$ are omitted so that directed edges connected with state $s_1$ at $T_k$ are easy to see.

In this situation, processing for setting the immediately preceding term ($T_k$) as the current term (t) is performed as processing corresponding to step 525 of the flowchart 500. Then, as processing corresponding to step 530, data on state S (here $s_1, s_2, s_3$) that is possible in the current term ($t=T_k$) is generated as graph nodes. The state nodes generated are connected with target state nodes by directed edges. Each of the directed edges is combined with data on the transition probability of transitioning from the source state to the target state when an action is executed and the probability distribution of reward that is obtained when the action is executed, for each action that can be executed in the source state connected by the edge (see FIG. 7).

Next, state $s_1$ is selected as one of possible states in the current term ($t=T_k$) as processing corresponding to step 535, and $a_1$ is selected as an action candidate that can be executed in state $s_1$ as processing corresponding to step 540. Then, as processing corresponding to step 545, data on probability distribution of X is generated with reference to the transition probability and probability distribution of reward for action candidate $a_1$ that are combined with each of directed edges leading from state $s_1$ in the current term ($t=T_k$) to states $s_1, s_2, s_3$ of the next term ($T_{k+1}$) (see FIG. 8). Then, as processing corresponding to step 550, risk measure $V_\alpha$ is calculated for action candidate $a_1$ using the generated data on probability distribution of X (see FIG. 9).

Figure 10:
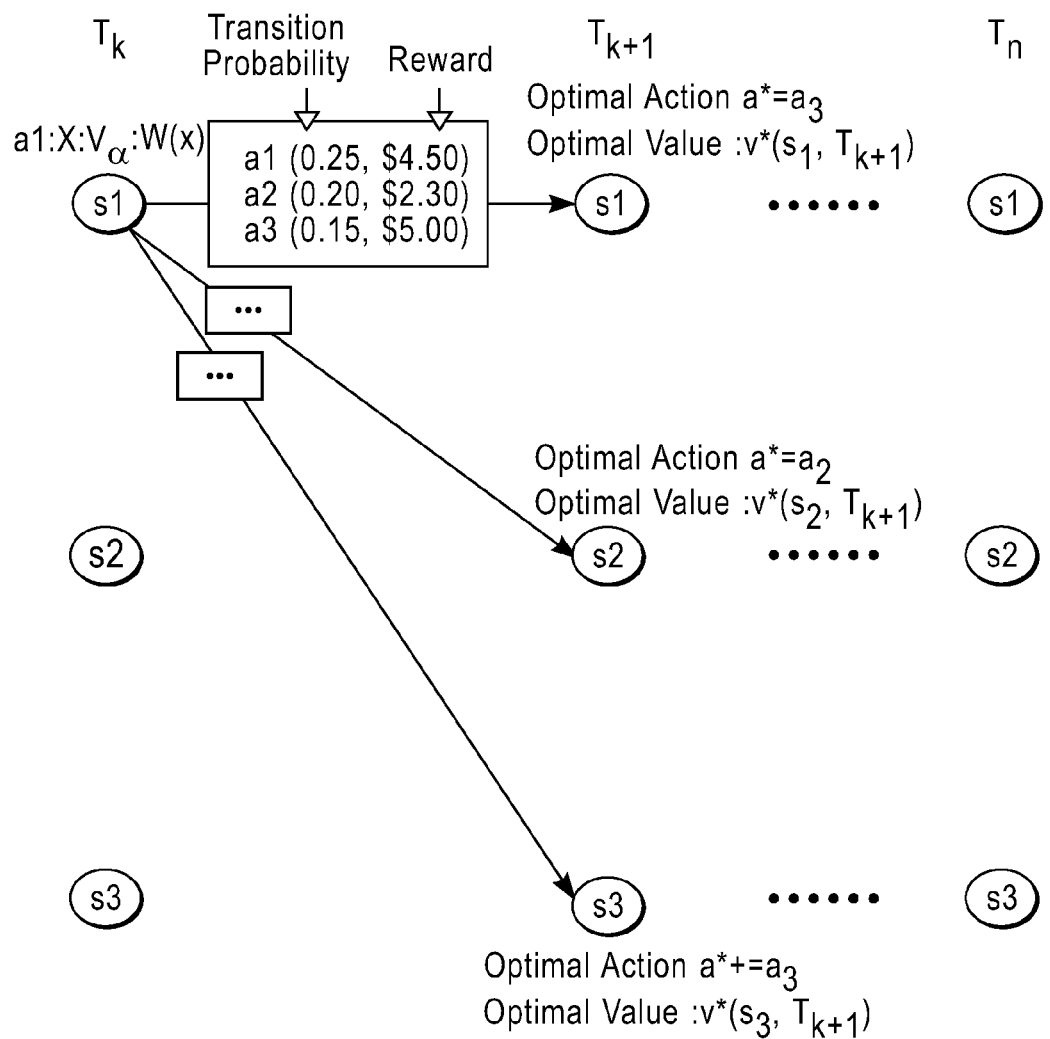
FIG. 10 illustrates flow of data processing for determining an optimal action according to an embodiment of the invention.
Figure 11:
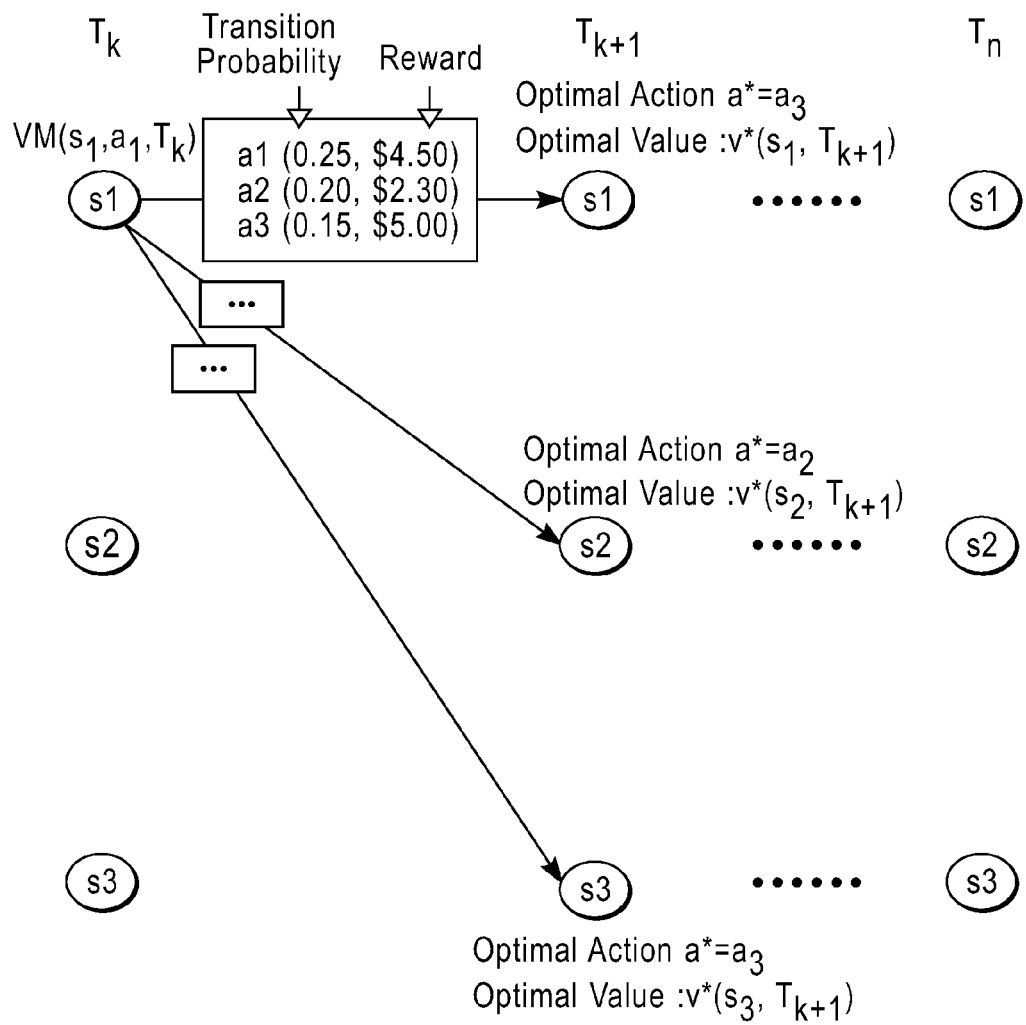
FIG. 11 is a diagram for illustrating flow of data processing for determining optimal actions according to an embodiment of the invention.

Then, as processing corresponding to step 555, weighting function w(x) is determined using risk measure $V_\alpha$ (see FIG. 10). As already mentioned, the weighting function w(x) is determined in accordance with various preferences. The preferences can be specified when the user sends a request, specified by the system administrator in advance, or automatically configured according to a predetermined algorithm when the optimal action decision system has received a request from a user. Then, as processing corresponding to step 560, value measure VM ($a_1, s_1, T_k$) for action candidate $a_1$ is calculated using the weighting function w(x) (see FIG. 11).

Figure 12:
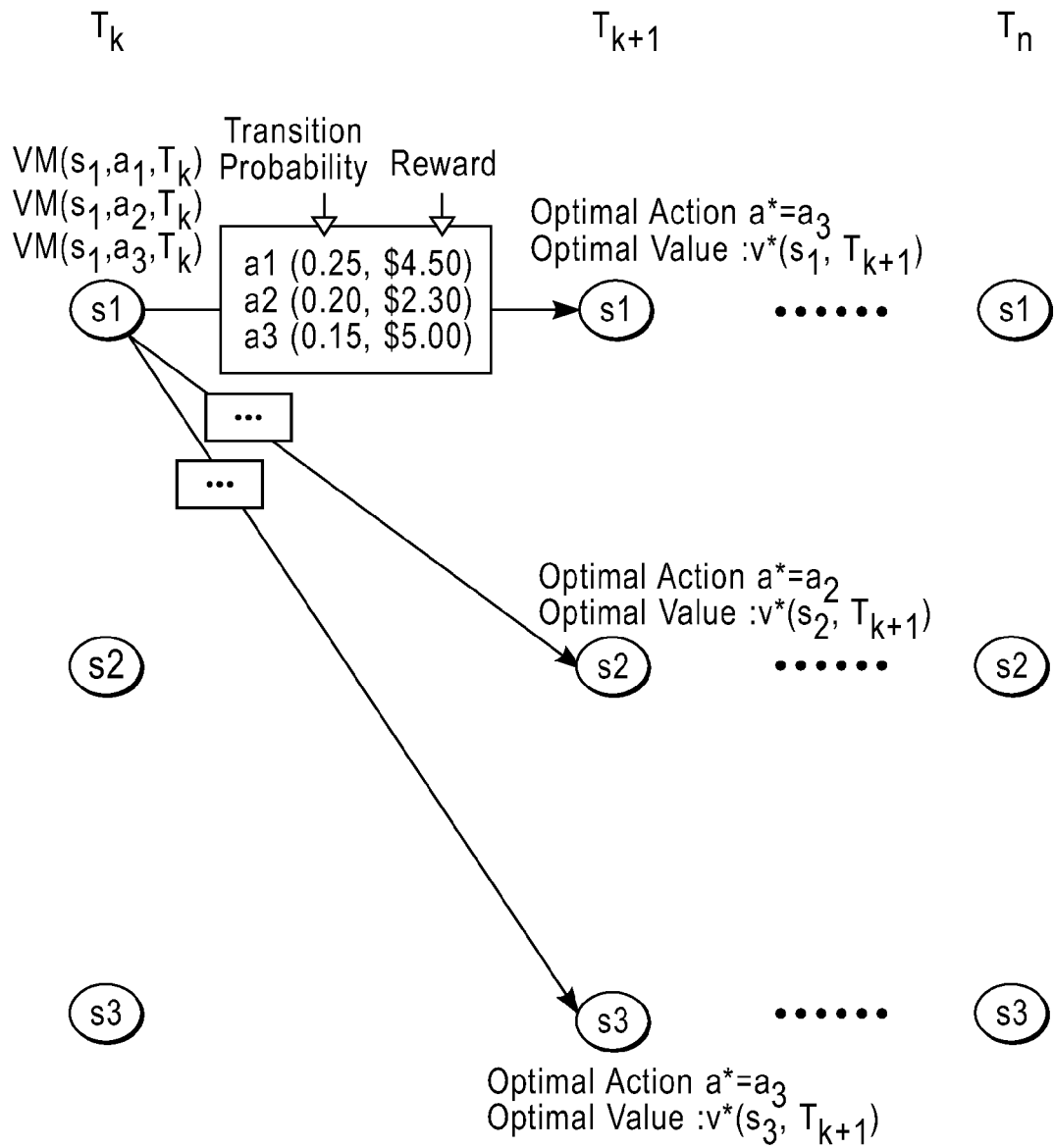
FIG. 12 is a diagram for illustrating flow of data processing for determining optimal actions according to an embodiment of the invention.
Figure 13:
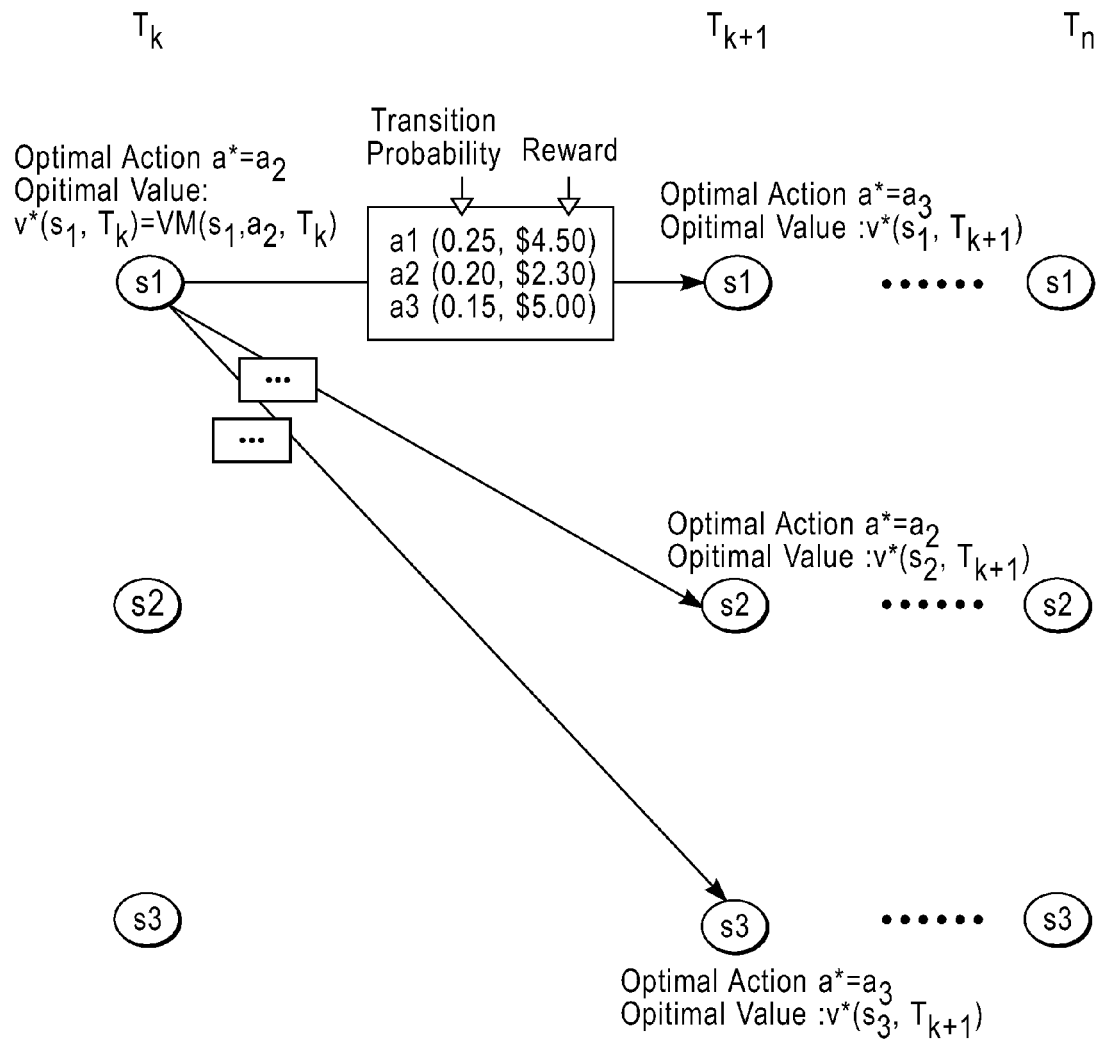
FIG. 13 is a diagram for illustrating flow of data processing for determining optimal actions according to an embodiment of the invention.
Figure 14:
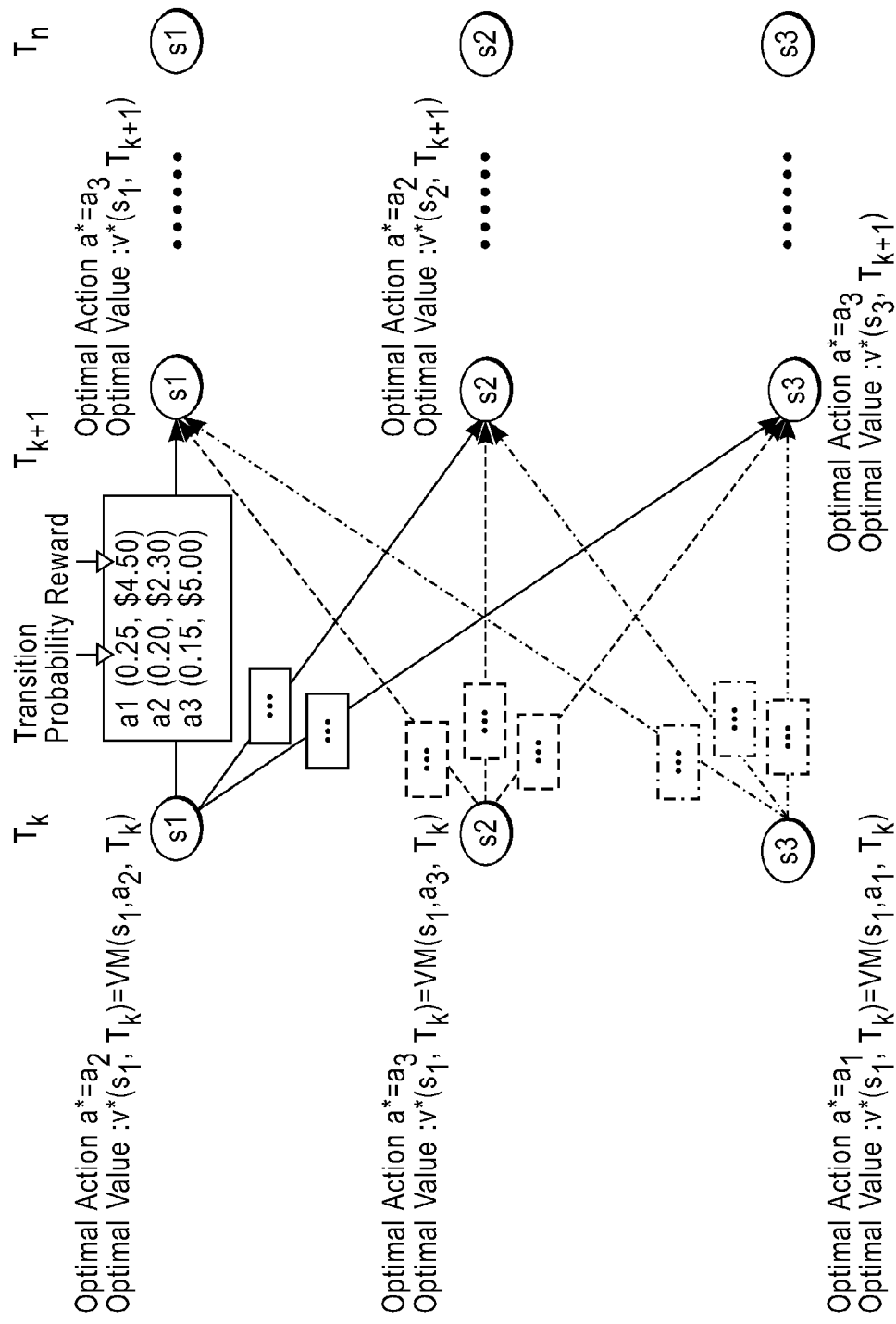
FIG. 14 is a diagram for illustrating flow of data processing for determining optimal actions according to an embodiment of the invention.
Figure 15:
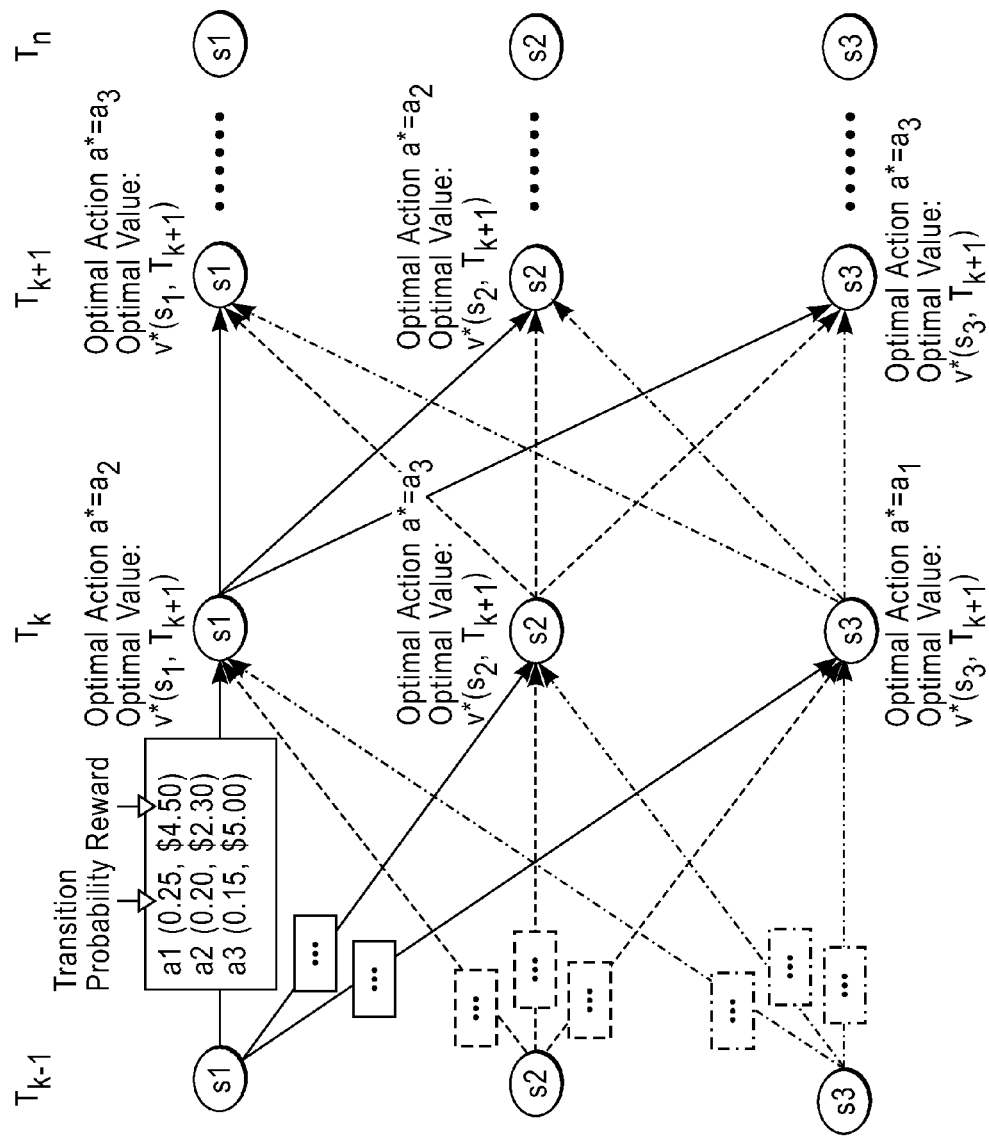
FIG. 15 is a diagram for illustrating flow of data processing for determining optimal actions according to an embodiment of the invention.

The above described process is executed on the other action candidates ($a_2, a_3$) (the loop from steps 540 through 565) to result in VM ($a_1, s_1, T_k$), VM ($a_2, s_1, T_k$), VM ($a_3, s_1, T_k$), which are value measures for the individual action candidates $a_1, a_2, a_3$ that can be executed in possible state $s_1$ at $T_k$ (see FIG. 12). The value measures are compared with one another, an action candidate corresponding to the best value measure is determined to be the optimal action in possible state $s_1$ at $T_k$ (step 570), and the optimal action and the corresponding value measure (the optimal value) are stored (step 575). In this example, VM ($a_2, s_1, T_k$) is best among the three value measures and accordingly action $a_2$ is determined to be the optimal action (see FIG. 13).

The above-described process is also carried out on the other states ($s_2, s_3$) that are possible in the current term ($t=T_k$) (the loop from step 535 to 580), so that the optimal action and optimal value are determined and stored for each of states, $S=s_1, s_2, s_3$, possible in the current term ($t=T_k$). Through this data processing, optimal actions for the current term ($t=T_k$) are determined. Processing for setting the immediately preceding term ($T_{k-1}$) as the current term (t) is performed ($t=T_{k-1}$), and data on possible states in the new current term ($t=T_{k-1}$) is generated in a similar manner (FIG. 15) to determine optimal actions for all possible states. The similar process will be repeated up to the first term ($T_1$) of the time horizon (the loop from step 525 to 570).

Figure 16:
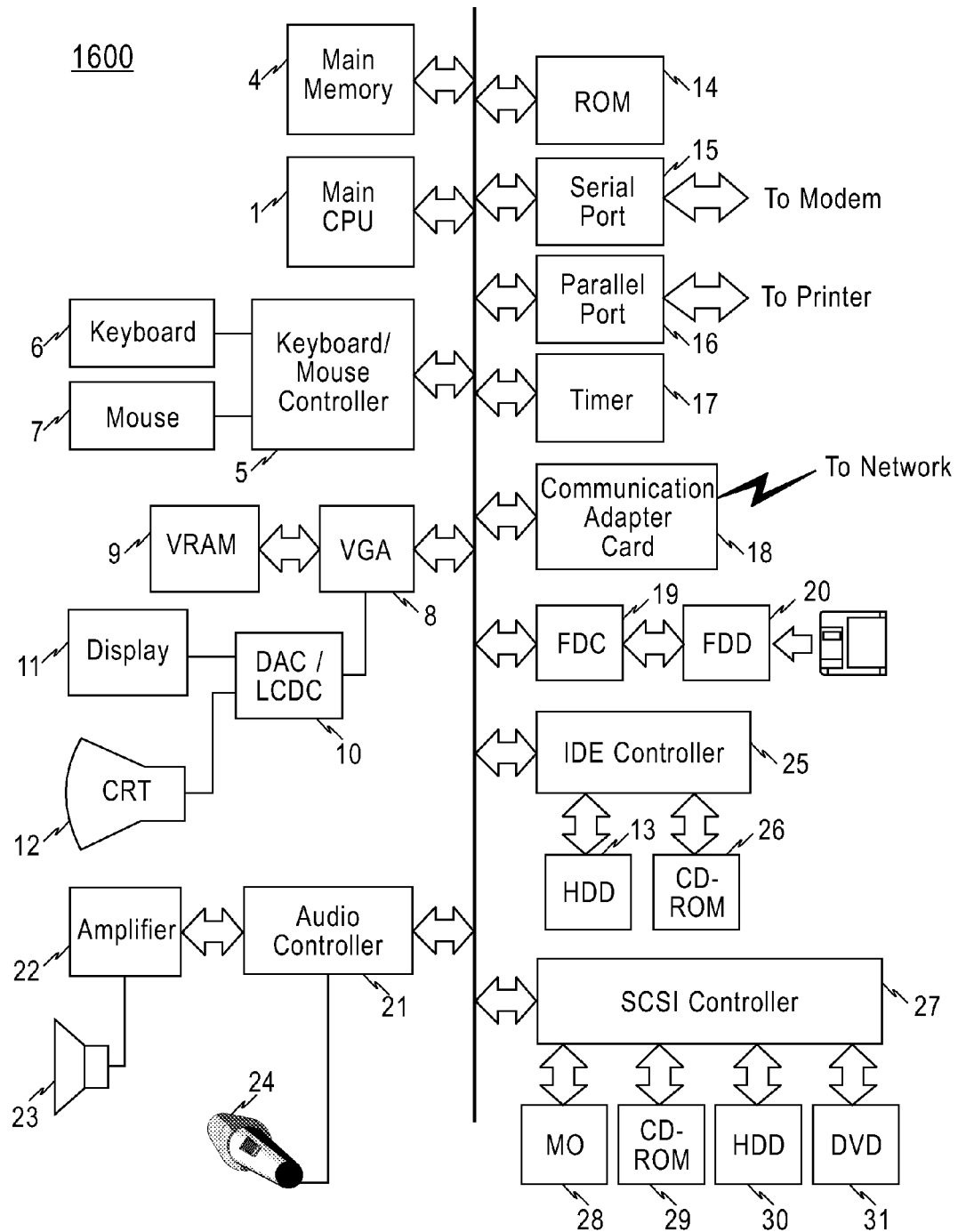
FIG. 16 shows an example of hardware configuration of an information processing device functioning as the optimal action decision system.

FIG. 16 shows an example hardware configuration of an information processing device suitable for realizing optimal action decision system 120 according to embodiments of the invention. The information processing device includes a Central Processing Unit (CPU) 1 and a main memory 4 which are connected to a bus 2. The CPU 1 in embodiments of the invention is a multi-core processor, so that divided portions of an XML document are sent to the cores of the CPU 1 for parallel processing.

Hard disk devices 13, 30, and removable storages (external storage systems permitting exchange of a recording medium), such as a CD-ROM devices 26, 29, a flexible disk device 20, an MO device 28, and a DVD device 31, are connected with the bus 2 by way of a floppy(R) disk controller 19, an IDE controller 25, a SCSI controller 27 and so on.

Storage media such as a flexible disk, MO, CD-ROM, DVD-ROM are inserted into the removable storage. These storage media, the hard disk devices 13, 30, and ROM 14 can record code of a computer program for giving instructions to the CPU and the like in cooperation with the operating system to practice the present invention. The computer program is executed by being loaded into the main memory 4. The computer program can be compressed or divided into multiple portions and recorded on multiple media.

The information processing device accepts input from an input device, such as keyboard 6 and a mouse 7, via a keyboard/mouse controller 5. The information processing device is connected with a display device 11 for presenting visual data to the user by way of a DAC/LCDC 10.

The information processing device can be connected with a network via network adapter 18 (such as an Ethernet (R) card and a token ring card) and communicate with other computers or the like. Although not shown, the information processing device can also be connected with a printer via a parallel port or a modem via a serial port.

From the descriptions above, it will be readily understood that an information processing device suitable for realizing optimal action decision system 120 according to embodiments of the invention is realized in an information processing device, such as a typical personal computer, a workstation, a main frame computer, or a combination thereof. However, these components are only illustrative and not all the components are essential for the present invention.

Needless to say, various modification, such as implementing the hardware components of the information processing device used in embodiments of the invention by combining machines and distributing functions among them, can be easily conceived by those skilled in the art. Such modifications are concepts that are naturally included in the spirit of the invention.

The data processing system according to embodiments of the invention adopts an operating system supporting a GUI (graphical user interface) multi-window environment, such as Windows (R) operating system provided by Microsoft Corporation, Mac OS (R) provided by Apple Computer Incorporated, and a UNIX (R)-based system with X Window System (e.g., AIX (R) provided by International Business Machines Corporation).

From the foregoing, it is appreciated that the data processing system for use in embodiments of the invention is not limited to a specific multi-window operating system environment.

Second Embodiment

A second embodiment of the invention will be described. The second embodiment takes into account cumulative reward, c, which is the total amount of reward obtained from the first term up to the current term, when determining an optimal action. It can be desirable to take cumulative reward c into consideration in determination of an optimal action for a certain term. This can be the case when one possesses a small asset in a certain state and it is desired to avoid high-risk actions that can lead to bankruptcy and execute low-risk actions, for example. In such a case, it is preferable to determine optimal actions in consideration of cumulative reward c as an asset he possesses.

The overall configuration of the second embodiment of the invention is similar to that of the first embodiment (see FIG. 1) except that cumulative reward c is added as a new factor to transition probability storing unit 130 (FIG. 17) and reward parameter storing unit 140 is not utilized.

FIG. 17 shows an example data structure of transition probability storing unit 130 according to the second embodiment of the invention. Transition probability storing unit 130 stores the transition probability of transitioning to a specific pair of a state and a cumulative reward when an action is executed with each of combinations of states and cumulative rewards. Cumulative reward is represented by variable c, specifically, $c_1$, $c_2$, . . . , $c_q$ and so on. A set of possible cumulative rewards is defined as C. Accordingly, c∈C. As designations relating to states and actions are similar to those of the first embodiment, their detailed descriptions are omitted. Transition probability storing unit 130 according to embodiments of the invention stores a transition probability for each combination of a set of a source state, cumulative reward, and an action (s, c, a), and a pair of a target state and a cumulative reward (s', c').

The functional configuration, flow of processing, and hardware configuration of the second embodiment of the invention are similar to those of the first embodiment (see FIGS. 4, 5 and 16). Thus, they are not discussed in further detail here.

The second embodiment differs from the first embodiment in how to calculate probability distribution of an evaluation value X. Specifically, the probability distribution of the evaluation value X calculated by probability distribution calculating unit 420 at step 545 is calculated according to the expression below for a selected action "a" with reference to transition probability storing unit 130 that takes into consideration cumulative reward c, an example of which is shown in FIG. 17. In the expression below, v*(s', c', t+1) represents the optimal value associated with the pair of state s' in the next term and cumulative reward c'. $p_t$(s', c'|s, c, a) represents the probability of transitioning to the pair of state s' and cumulative reward c' when action a is executed on the pair of state s and cumulative reward c in the current term. The sum represented by Σ is determined by adding up $p_t$(s',c'|s,c,a) for all pairs of s' and c' that make v*(s',c',t+1)=x. Note that, unlike the first embodiment, X in the second embodiment corresponds to the optimal value for the next term.

$$X = x \text{ with probability} \sum_{(s',c'):v^*(s',c',t+1)=x} p_t(s', c' \mid s, c, a) \quad \text{[Expression 7]}$$

The second embodiment of the invention exhaustively repeats the loop from step 535 through 580 on pairs of state s and cumulative reward c for each term of the time horizon using the probability distribution calculated as described above, and determines an optimal action for each pair of possible state s and cumulative reward c.

In the process, the second embodiment can adopt a preference to maximize expectation E[X] with risk represented by Value at Risk as a constraint. An objective function $\rho_t$ (X) optimized for this preference is represented by the expression below, where E[X] is an expectation. Note also that I{$V_\alpha$>δ} means that 1 is returned if {$V_\alpha$>δ} is true and 0 if {$V_\alpha$>δ} is false. In this case, the extent of risk taking can be adjusted by varying the values of α, λ, and δ in the expression.

$$\rho_t(X) = E[X] - \lambda(V_\alpha - \delta)^* I\{V_\alpha > \delta\} \quad \text{[Expression 8]}$$

where E[X] is an expectation.

If the above described preference is adopted, the following weighting function w(x) can be established:

$$w(x)=Pr(X=x) \text{ (if } V_a \leq \delta)$$

$$w(x)=Pr(X=x) \text{ (if } V_\alpha > \delta \text{ and } x \neq \lambda(\delta - V_a))$$

$$w(x)=Pr(X=x)+1 \text{ (if } V_a > \delta \text{ and } x = \lambda(\delta - V_a))$$ [Expression 9]

Because the second embodiment of the invention realizes determination of optimal actions that also considers cumulative reward c, information about preferable actions can be obtained when it is desirable to take cumulative reward c into account at the time of determining optimal actions for a certain term.

Although the second embodiment of the invention has been described thus far on the assumption that it uses the optimal value v*(s', c', t+1) derived using a finite number of cumulative rewards c, optimal value v*(s', c',t+1) can be made a continuous value using linear interpolation or the like and continuous optimal value v*(s', c',t+1) can be used.

Information system 100 according to the embodiments of the invention can determine optimal actions that consider risk and have time-consistency in accordance with a predetermined preference, for each of states in each term of the time horizon $(t_1, t_2, \ldots, t_n)$ between which transition can occur with a certain transition probability if a certain action is executed.

Additionally, the present invention can be realized in hardware, software, or combination of hardware and software. A typical example of implementation with combination of hardware and software is a data processing system having a specific program. In this case, the program is loaded into the data processing system and executed to control the data processing system and cause it to perform processing according to the invention. The program is composed of instructions that can be represented by an arbitrary language code representation. Such instructions enable the system to perform specific functions directly or after one or both of: 1. conversion to a different language code representation, and 2. replication to another medium.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer. Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although the invention has been described with respect to its embodiments, the technical scope of the invention is not limited to the scope set forth in the embodiments. It will be apparent to those skilled in the art that various modifications or alterations can be made to the embodiments. For example, while the embodiments described above determine risk measure $V_\alpha$ using Value at Risk, other risk measures than Value at Risk can be used. An example of such risk measures is the probability that X exceeds a predetermined value d, Pr (X>d) (also called exceedance probability). It is apparent from descriptions in claims that such modified or altered embodiments also fall within the technical scope of the invention.

What is claimed is:

1. A method for determining an optimal action in consideration of risk, the method comprising the steps of:
   (a) selecting, with a processing device, a state from possible states in a current term, wherein said current term belongs to a time horizon;
   (b) selecting, with a processing device, an action from at least one action candidate that can be executed in a selected state;
   (c) calculating, with a processing device, a probability distribution of an evaluation value for a selected action, wherein said evaluation value corresponds to a reward obtained in said current term and an optimal value for next term;
   (d) calculating, with a processing device, a risk measure using said probability distribution of said evaluation value;
   (e) determining, with a processing device, a weighting function conforming to a preference by taking said risk measure into consideration;
   (f) calculating, with a processing device, a value measure of said selected action;
   (g) repeating steps (b) through (f) for all other said action candidates that can be executed in said selected state; and
   (h) comparing, with a processing device, said value measures of said selected actions in order to determine an optimal action for said selected state;
   wherein said processing device is configured to be able to access:
   a transition probability storing unit that stores, for each of said possible states, a transition probability of transitioning to said state when said action is executed in said state; and
   a reward parameter storing unit that stores, for each of said possible states, at least one parameter indicative of said probability distribution of said reward obtained when transition to said state occurs as a result of executing said action in said state, wherein
   said computer device generates, with reference to said transition probability and said at least one parameter, a graph data that comprises:
   node data representing said possible states in said time horizon;
   directed edge data representing transitions from said possible states in said current term to possible states for said next term; and
   attribute data representing at least one said action that can be executed in each of said possible states in said current term, said transitional probability of transitioning to each target state when each of at least one said action is executed, and said probability distribution of said reward that is obtained when said action is executed.

2. The method according to claim 1, further comprising the step of:
   (i) repeating steps (a) through (h) for all other said possible states in said current term.

3. The method according to claim 2, further comprising the steps of:
   (j) storing said optimal action and a value measure corresponding to said optimal action for said selected state;
   (k) setting a new current term, wherein said new current term is a term immediately preceding said current term; and
   (l) repeating steps (a) through (i) in order to determine said optimal action for each of said possible states in said new current term.

4. The method according to claim 3, further comprising the step of:
   (m) repeating steps (a) through (l) until a first term of said time horizon becomes said current term.

5. The method according to claim 1, wherein step (f) further comprises the step of:
   calculating, with said processing device, a weighted sum using said weighting function in order to calculate said value measure of said selected action.

6. The method according to claim 1, wherein said probability distribution of said evaluation value is determined so that:
   a realized value of said probability distribution is a sum of said value measures, wherein said value measures relate to said reward for said current term and reward for said optimal action at a target state of said next term; and
   a probability of realization equals probability that transition to said target state occurs and said reward is obtained given that said action is executed in said state of said current term.

7. The method according to claim 6, wherein said preference is a cumulative preference to balance maximization of final cumulative reward and minimization of risk, and said weighting function is defined by an expression:

$$w(x) = b\, Pr(X=x) \text{ (if } x \neq -V_a)$$

$$w(x) = b\, Pr(X=-V_a) + 1 - b \text{ (if } x = -V_a)$$

wherein:
$V_a$ is a risk measure;
Pr is a probability;
X is a random variable;
x is a value of instance; and
b is a varying value that can be changed in order to adjust an extent of risk taking.

8. The method according to claim 6, wherein said preference is an ICTE preference to minimize the value of ICTE and said weighting function is defined by an expression:

$$w(x) = Pr(X=x)/(1-\alpha) \text{ (if } x > V_a)$$

$$w(V_a) = (\beta - \alpha)/(1-\alpha) \text{ (if } x < V_a)$$

$$w(x) = 0$$

where $$\beta = Pr(X \leq V_a)$$

wherein:
$V_a$ is a Value at Risk;
$\alpha$ is a varying value that can be changed in order to adjust an extent of risk taking;
X is an evaluation value; and
Pr is a probability.

9. The method according to claim 6, wherein said preference is an expectation preference to maximize an expectation with risk represented by Value at Risk as a constraint, wherein an objective function $\rho t\,(X)$ is defined by an expression:

$$\rho_t(X) = E[X] - \lambda(V_a - \delta) * I\{V_a > \delta\}$$

wherein:
$V_a$ is a Value at Risk;
E[X] is an expectation;
$I\{V_a > \delta\}$ is 1 if $(V_a > \delta)$ is true;
$I\{V_a > \delta\}$ is 0 if $(V_a > \delta)$ is false; and
$\alpha, \lambda,$ and $\delta$ are varying values that can be changed in order to adjust an extent of risk taking.

10. The method according to claim 9, wherein said weighting function is defined by an expression:

$$w(x) = Pr(X=x) \text{ (if } V_a \leq \delta)$$

$$w(x) = Pr(X=x) \text{ (if } V_a > \delta \text{ and } x \neq \lambda(\delta - V_a))$$

$$w(x) = Pr(X=x) + 1 \text{ (if } V_a > \delta \text{ and } x = \lambda(\delta - V_a))$$

wherein:
Pr is a probability;
$V_a$ is a Value at Risk;
X is a random variable;
x is a value of instance; and
$\delta, \lambda$ are varying values that can be changed in order to adjust an extent of risk taking.

11. The method according to claim 1, wherein said risk measure is calculated by using Value at Risk for said probability distribution of said evaluation value.

12. A non-transitory computer readable storage medium tangibly embodying a computer readable program code having computer readable instructions which when implemented, cause a computer to carry out the steps comprising:
(a) selecting a state from possible states in a current term, wherein said current term belongs to a time horizon;
(b) selecting an action from at least one action candidate that can be executed in a selected state;
(c) calculating a probability distribution of an evaluation value for a selected action, wherein said evaluation value corresponds to a reward obtained in said current term and an optimal value for next term;
(d) calculating a risk measure using said probability distribution of said evaluation value;
(e) determining a weighting function conforming to at least one preference by taking said risk measure into consideration;
(f) calculating a value measure of said selected action;
(g) repeating steps (b) through (f) for all other said action candidates that can be executed in said selected state; and
(h) comparing said value measures of said selected actions in order to determine an optimal action for said selected state;
wherein said computer is configured to be able to access:
a transition probability storing unit that stores, for each of said possible states, a transition probability of transitioning to said state when said action is executed in said state; and
a reward parameter storing unit that stores, for each of said possible states, at least one parameter indicative of said probability distribution of said reward obtained when transition to said state occurs as a result of executing said action in said state, wherein
said computer device generates, with reference to said transition probability and said at least one parameter, a graph data that comprises:
node data representing said possible states in said time horizon;
directed edge data representing transitions from said possible states in said current term to possible states for said next term; and
attribute data representing at least one said action that can be executed in each of said possible states in said current term, said transitional probability of transitioning to each target state when each of at least one said action is executed, and said probability distribution of said reward that is obtained when said action is executed.

13. The computer readable storage medium according to claim 12, further comprising the step of:
(i) repeating steps (a) through (h) for all other said possible states in said current term.

14. The computer readable storage medium according to claim 13, further comprising the steps of:
(j) storing said optimal action and a value measure corresponding to said optimal action for said selected state;
(k) setting a new current term, wherein said new current term is a term immediately preceding said current term; and
(l) repeating steps (a) through (i) in order to determine said optimal action for each of said possible states in said new current term.

15. The computer readable storage medium according to claim 14, further comprising the step of:
(m) repeating steps (a) through (l) until a first term of said time horizon becomes said current term.

16. A system that determines an optimal action in consideration of risk, the system comprising:
a processing device in operable communication with a storage device, the processing device configured to execute a plurality of modules, comprising:

a first selection module for selecting a state from possible states in a current term, wherein said current term belongs to a time horizon;
a second selection module for selecting an action from action candidates that can be executed in a selected state;
a probability distribution module for calculating a probability distribution of an evaluation value for a selected action, wherein said evaluation value corresponds to a reward obtained in said current term and an optimal value for next term;
a risk measure module for calculating a risk measure using said probability distribution of said evaluation value;
a decision module for determining a weighting function conforming to a preference by taking said risk measure into consideration;
a value measure module for calculating a value measure of said selected action;
a first control module for repeating the steps from said first selection module, said second selection module, said probability distribution module, said risk measure module, said decision module, and said value measure module for all other said action candidates that can be executed in said selected state; and
a comparing module for comparing said value measures of said selected actions in order to determine an optimal action for said selected state;
wherein said processing device is configured to be able to access:
a transition probability storing unit that stores, for each of said possible states, a transition probability of transitioning to said state when said action is executed in said state; and
a reward parameter storing unit that stores, for each of said possible states, at least one parameter indicative of said probability distribution of said reward obtained when transition to said state occurs as a result of executing said action in said state, wherein
said computer device generates, with reference to said transition probability and said at least one parameter, a graph data that comprises:
node data representing said possible states in said time horizon;
directed edge data representing transitions from said possible states in said current term to possible states for said next term; and
attribute data representing at least one said action that can be executed in each of said possible states in said current term, said transitional probability of transitioning to each target state when each of at least one said action is executed, and said probability distribution of said reward that is obtained when said action is executed.

17. The system according to claim 16, further comprising:
a second control module for repeating the steps from said first selection module, said second selection module, said probability distribution module, said risk measure module, said decision module, said value measure module, and said comparing module for all other said possible states in said current term.

18. The system according to claim 17, further comprising:
a storing module for storing said optimal action and a value measure corresponding to said optimal action for said selected state;
a new term module for setting a new current term, wherein said new current term is a term immediately preceding said current term; and
a third control module for repeating the steps from said first selection module, said second selection module, said probability distribution module, said risk measure module, said decision module, said value measure module, said comparing module, and said second control module in order to determine said optimal action for each of said possible states in said new current term.

19. The system according to claim 18, further comprising:
a fourth control module for repeating the steps from said first selection module, said second selection module, said probability distribution module, said risk measure module, said decision module, said value measure module, said comparing module, said second control module, said storing module, said new term module, and said third control module until a first term of said time horizon becomes said current term.

* * * * *